United States Patent
Shao et al.

(10) Patent No.: US 8,111,647 B2
(45) Date of Patent: Feb. 7, 2012

(54) SYSTEM AND METHOD FOR WIRELESS COMMUNICATION OF UNCOMPRESSED VIDEO HAVING A DUAL-BEACON MECHANISM FOR TWO DEVICE TYPES

(75) Inventors: Huai-Rong Shao, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 975 days.

(21) Appl. No.: 12/029,444

(22) Filed: Feb. 11, 2008

(65) Prior Publication Data

US 2010/0246537 A9    Sep. 30, 2010

Related U.S. Application Data

(60) Provisional application No. 60/943,022, filed on Jun. 8, 2007.

(51) Int. Cl.
  *H04B 7/212* (2006.01)
  *H04W 72/00* (2009.01)
  *G01S 1/00* (2006.01)
  *H04M 1/00* (2006.01)
  *H04L 27/28* (2006.01)

(52) U.S. Cl. ........ 370/322; 370/337; 370/348; 342/386; 375/260; 455/450; 455/562.1

(58) Field of Classification Search .................. 370/322, 370/337, 348; 342/386; 375/260; 455/450, 455/562.1
See application file for complete search history.

(56) References Cited

U.S. PATENT DOCUMENTS

| | | | |
|---|---|---|---|
| 7,420,501 B2 * | 9/2008 | Perl | 342/30 |
| 7,460,082 B2 * | 12/2008 | Li et al. | 343/893 |
| 7,489,932 B2 * | 2/2009 | Chari et al. | 455/447 |
| 7,804,842 B2 * | 9/2010 | Malik et al. | 370/445 |

(Continued)

OTHER PUBLICATIONS

ECMA-368 Specification, Distributed Medium Access Control (MAC) for Wireless Networks, European Computer Manufacturer Association, 2$^{nd}$ Edition, Dec. 2007, pp. 1-344.

(Continued)

*Primary Examiner* — Alpus H Hsu

(74) *Attorney, Agent, or Firm* — Kenneth L. Sherman, Esq.; Michael Zarrabian, Esq.; Myers Andras Sherman & Zarrabian LLP

(57) ABSTRACT

A system and method of wireless data communication over a network of devices and device types are disclosed. In one aspect, the beacons of a first device type are sent and received from devices of the first device type or a second device type, by a first device of the first device type. A plurality of beacons of the first device type or the second device type are sent or received from a plurality of devices of the first device type or a second device type, by a second device of the second device type. Each of channels by the first device is sensed. A free channel for data communication between the first device and the second device is located. Beacons of the first device type are sent out by the first device. Channel reservations of time blocks are made of the free channel for data transmissions.

27 Claims, 7 Drawing Sheets

U.S. PATENT DOCUMENTS

| | | | |
|---|---|---|---|
| 7,822,000 B2* | 10/2010 | Sekhar | 370/337 |
| 2005/0037822 A1* | 2/2005 | Regnier et al. | 455/575.5 |
| 2005/0180357 A1* | 8/2005 | Tao et al. | 370/329 |
| 2006/0198353 A1* | 9/2006 | Wason et al. | 370/347 |
| 2007/0286107 A1* | 12/2007 | Singh et al. | 370/312 |
| 2008/0198829 A1* | 8/2008 | Cheng et al. | 370/342 |
| 2010/0111006 A1* | 5/2010 | Zhai et al. | 370/329 |

OTHER PUBLICATIONS

Ecma/TC32-TG20/2007/085, "Coexistence and Interoperability (ETRI, GEDC, Intel and Philips," ECMA International Meeting, Korea University, Seoul, Apr. 30-May 3, 2007.

Official Minutes, 17$^{th}$ TC32-TG20 ECMA International Meeting, Korea University, Seoul, Apr. 30-May 3, 2007.

* cited by examiner

SYSTEM AND METHOD FOR WIRELESS COMMUNICATION OF UNCOMPRESSED VIDEO HAVING A DUAL-BEACON MECHANISM FOR TWO DEVICE TYPES

CROSS-REFERENCE TO RELATED APPLICATION

This application claims priority under 35 U.S.C. §119(e) from U.S. Provisional Application No. 60/943,022 filed on Jun. 8, 2007, entitled "System and method for wireless communication of incompressed video having interoperability support using dual beacon mechanism," which is hereby incorporated by reference in its entirety.

BACKGROUND OF THE INVENTION

1. Field of the Invention

The invention relates to interoperability support using a dual beacon mechanism for wireless transmissions.

2. Brief Description of the Related Technology

A wireless network may comprise a plurality of devices of different types: simple device (SD) and advanced devices (AD), including devices having a directional antenna and devices having an omni-directional antenna. In order to set up a network with the simple devices and the advanced devices, solving an interoperability problem between the devices of different types is necessary. For example, the European Computer Manufacturers Association (ECMA) standard and Institute of Electrical and Electronics Engineers (IEEE) 802.15.3c are directed to the problem.

In the wireless network communication community, a coexistence and interoperability scheme was suggested. The suggestions included: (1) An AD is only capable of sending and receiving AD-waveform beacons, and is not able to send or receive SD-waveform beacons, (2) An SD is capable of sending and receiving SD-waveform beacons, and is also able to send AD-waveform beacons but not able to receive AD-waveform beacons, and (3) If an SD and an AD want to talk to each other, a master/slave approach is proposed in which an AD (master) reserves bandwidth for an SD (slave) by special signaling procedure.

However, the above approach has following drawbacks. (1) The SD implementation complexity is increased by requiring an SD to send out AD-waveform beacons. (2) Power consumption of an SD is increased due to the AD-waveform beacons. Some SDs can be portable devices which have strict power saving requirement. (3) It is difficult for an SD and an AD to discover each other and transmit data between each other. The master/slave mechanism proposed causes hidden terminal problem and interference problem.

SUMMARY OF CERTAIN INVENTIVE ASPECTS

One aspect of the invention is a method of wireless data communication over a network of devices including at least one directional device having a directional antenna and at least one omni-directional device having an omni-directional antenna, the method comprising sending, via a selected directional device, a plurality of directional beacons, receiving, at the selected directional device, a plurality of directional beacons, sending, via a selected omni-directional device, a plurality of directional and omni-directional beacons, receiving, at the selected omni-directional device, a plurality of direction and omni-directional beacons, sensing, by the selected directional device, each of a plurality of channels, locating a channel with free channel time blocks for data communication between the selected directional device and the selected omni-directional device, and making channel reservations of free channel time blocks for data transmissions.

Another aspect of the invention is a system for wireless data communication over a network of devices, the system comprising a directional device having a directional antenna, wherein the directional device is configured to send and receive a plurality of directional beacons, and an omni-directional device having an omni-directional antenna, wherein the omni-directional device is configured to send and receive a plurality of directional and omni-directional beacons.

Another aspect of the invention is a method of wireless data communication over a network of devices including at least one directional device having a directional antenna and at least one omni-directional device having an omni-directional antenna, the method comprising sensing, by a directional device, each of a plurality of channels, locating a plurality of directional beacons, recording channel use information, selecting a channel based, at least in part, on the recorded channel use information, integrating channel reservation information from the plurality of directional beacons of the selected channel, placing the integrated channel reservation information into a new directional beacon, and selecting a free time slot of the selected channel to periodically send out the new directional beacon.

Yet another aspect of the invention is a method of wireless data communication over a network of devices including at least one directional device having a directional antenna and at least one omni-directional device having an omni-directional antenna, the method comprising sensing, by an omni-directional device, each of a plurality of channels, locating a plurality of directional beacons and a plurality of omni-directional beacons, recording channel use information, selecting a channel based, at least in part, on the recorded channel use information, integrating channel time reservation information from the plurality of directional beacons of the selected channel and the plurality of omni-directional beacons of the selected channel, placing the integrated channel time reservation information into a new directional beacon and a new omni-directional beacon, and selecting a first free time slot of the selected channel to periodically send out the new directional beacon and a second free time slot of the selected channel to periodically send out the new omni-directional beacon.

Yet another aspect of the invention is a device for wireless data communication over a network of devices including at least one directional device having a directional antenna and at least one omni-directional device having an omni-directional antenna, the device comprising a directional antenna, a sensing module configured to sense each of a plurality of channels, a locating module configured to locate a plurality of directional beacons, a recording module configured to recorde channel use information, a first selecting module configured to select a channel based, at least in part, on the recorded channel use information, an integrating module configured to integrate channel reservation information from the plurality of directional beacons of the selected channel, a placing module configured to place the integrated channel reservation information into a new directional beacon, and a second selecting module configured to select a free time slot of the selected channel to periodically send out the new directional beacon.

Yet another aspect of the invention is a device for wireless data communication over a network of devices including at least one directional device having a directional antenna and at least one omni-directional device having an omni-directional antenna, the device comprising an omni-directional antenna, a sensing module configured to sense each of a plurality of channels, a locating module configured to locate a plurality of directional beacons and a plurality of omni-directional beacons, a recording module configured to record channel use information, a first selecting module configured to select a channel based, at least in part, on the recorded channel use information, an integrating module configured to integrate channel time reservation information from the plurality of directional beacons of the selected channel and the plurality of omni-directional beacons of the selected channel, a placing module configured to place the integrated channel time reservation information into a new directional beacon and a new omni-directional beacon, and a second selecting module configured to select a first free time slot of the selected channel to periodically send out the new directional beacon and a second free time slot of the selected channel to periodically send out the new omni-directional beacon.

Figure 1:
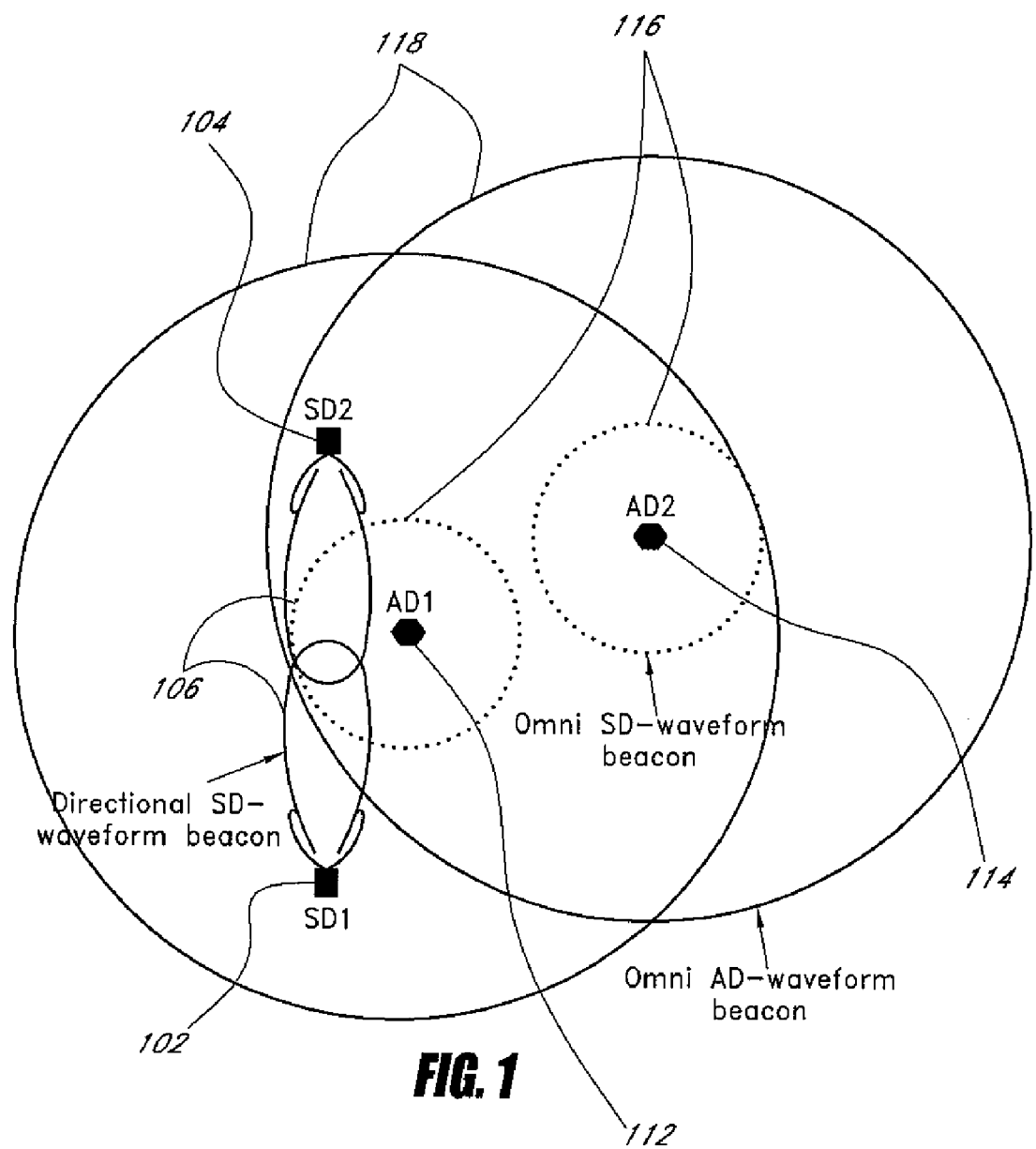
FIG. 1 is a diagram illustrating a dual-beacon solution.

DETAILED DESCRIPTION OF CERTAIN
INVENTIVE EMBODIMENTS

The following detailed description of certain embodiments presents various descriptions of specific embodiments of the invention. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.
Simple Device (SD) vs. Advanced Device (AD)

Certain embodiments provide a method and system for transmission of uncompressed high definition (HD) video information from a transmitter to a receiver over wireless channels.

An exemplary wireless video area network (WVAN) may consist of two different kinds of devices called simple device (SD) and advanced device (AD). In various embodiments, simple devices and advanced devices may differ fundamentally in three ways: 1) directionality, 2) range, and 3) the ability to transmit simple device waveform beacons or advanced device waveform beacons. Specifically, in these embodiments, simple devices only support directional transmission, whereas advanced devices can support omni-directional transmission. Omni-directional transmission may also include the ability to emulate omni-directional transmission using one or multiple directional antennas. Thus an omni-directional antenna may also include a directional antenna (or antennas) configured to emulate an omni-directional antenna. Simple devices generally operate over a shorter range than advanced devices. In some embodiments, simple devices work over a range of 3 meters or less, whereas advanced devices work over a range of 10 meters or less. Finally, simple devices generally can only send/receive simple-device-waveform beacons but advanced devices can send/receive both simple-device-waveform and advanced-device-waveform beacons.

As an example, SDs may be used for file transfer applications. The range of SDs may be about 3 meters or less. The quality of service (QoS) requirements may include high reliability and about 1 Gbps data rate, but no strict latency and jitter requirement. SDs may use sectored antenna and simple modulation such as OOK, BPSK, DBPSK, MSK, QPSK, etc. No coding or very simple coding system may be used.

ADs may be used for uncompressed video streaming applications. The range of ADs may be about 10 meters or less. The quality of service (QoS) requirements may include strict latency and jitter requirement to maintain stable streaming and several Gbps data rate. ADs may use beamsteering antenna and digital modulation such as 16-QAM. Advanced coding system may be used.
Beamforming vs. Directional Antenna Within 60 GHz band a massive amount of spectral space (at least 5 GHz in most countries) has been allocated worldwide for unlicensed wireless applications. With this wide band it is possible to support very high-speed applications such as uncompressed High Definition (HD) video streams and large file transfers.

At 60 GHz, there is much more path loss than at 2 or 5 GHz since free space loss increases quadratically with frequency. This higher free space loss can be compensated by the use of multiple antennas with more pattern directivity while maintaining small antenna dimensions. This technology is called beamforming. When beamforming is used, however, antenna obstruction (e.g., by a human body) and miss-pointing may easily cause a substantial drop of received power, which may nullify the gain provided by the antennas. Therefore, dynamic beamsearching and beamtracking is necessary to keep the stable beamforming transmission. Beamtracking means to keep monitoring the quality of beamforming channel. Beamsearching means to search for new beamforming coefficients to provide satisfied channel quality.

The other technology for 60 GHz transmission is the directional antenna solution in which one or multiple directional antennas of the sender can physically point to the receiver to compensate the higher free space loss. Usually there is no dynamic beamsearching with directional antenna solution.
Interoperability and Interference Since SD-waveforms and AD-waveforms are different, an SD which only supports SD-waveforms cannot understand the AD-waveform signals sent from ADs, and on the other side, an AD which only supports AD-waveforms cannot understand the SD-waveform signals sent from SDs. Without the capability to understand beacons of the opposite device type, transmission interference could occur since ADs and SDs do not know when the other kind of devices sends out data at the same frequency band.

In an exemplary real application, an SD and an AD may need to communicate data with each other. For example, a camcorder with SD capability may transfer files to a PC with AD capability. Since AD-waveforms and SD-waveforms are different, it would be difficult for an SD and an AD to transfer data to each other without an interoperability mechanism.

Dual-Beacon Mechanism

In order to solve the interoperability and interference problems, each device needs to periodically send beacons to notify other devices of its existence and channel time reservations. When a device powers on, the device searches for beacons from other devices first, and then finds a free beacon slot to send out its own beacon.

To support the interoperability between SD and AD devices, a dual-beacon mechanism is provided as follows:

(1) An AD needs to support the basic SD-waveform in which SD-waveform beacon is transmitted. The basic SD-waveform is also used to transmit data between an SD and AD. Examples of basic SD-waveforms are binary phase-shift keying (BPSK), differential phase shift keying (DPSK) or minimum shift keying (MSK).

(2) An AD is capable of sending and receiving both AD-waveform and SD-waveform beacons. AD-waveform beacons reach the same range as AD-waveform data transmissions (e.g., this is maximally 10 meters in ECMA). SD-waveform beacons reach the same range as SD-waveform data transmissions (e.g., this is maximally 3 meters in ECMA). Since an AD can send SD-waveform beacons, an SD can easily find an AD in the SD's transmission range. An AD-waveform beacon is sent out in basic AD-waveform mode. Examples of AD-waveforms are OFDM-BPSK, OFDM-MSK, etc. Thus, in some embodiments, ADs are capable of transmission using OFDM (orthogonal frequency-division multiplexing), whereas SDs are single carrier transmitters.

(3) The minimal requirement of beacon capability for an SD is to only send and receive SD-waveform beacons. In certain embodiments, an SD can have optional features of sending or receiving AD-waveform beacons.

(4) An AD sends out both AD-waveform and SD-waveform beacons in truly omni-directional mode or emulated nearly omni-directional mode to ease device discovery.

(5) The minimal requirement for an SD is to send out SD-waveform beacons in directional mode. In certain embodiments, an SD can have an optional feature of sending SD-waveform beacons in truly omni-directional mode or emulated nearly omni-directional mode to ease device discovery. The emulated nearly omni-directional mode may be achieved by rotating one or more direction antennas.

Referring to FIG. 1, first and second simple devices (SD1 and SD2) 102, 104 send out directional SD-waveform beacons 106. However, first and second advanced devices (AD1 and AD2) 112, 114 send out omni-directional SD-waveform 116 and AD-waveform beacons 118. The SD1 and SD2 102, 104 can hear and understand the SD-waveform beacons 116 sent from the AD1 112. However, the SD1 and SD2 102, 104 cannot understand the AD-waveform beacons 118 sent from AD1 112 since they do not support AD-waveforms.

Since an SD may not send and receive AD-waveform beacons, the interference cannot be avoided by beacon approach. However, since an AD sends and receives both SD-waveform and AD-waveform beacons, the SD does not interfere with AD-waveform transmissions.

An SD can only receive transmissions from ADs which are in the SD's transmission range, but the SD can get SD-waveform beacons from those ADs and those ADs can also get SD-waveform beacons from the SD, by which interference from SD to AD devices can be prevented. For example, referring to FIG. 1, the advanced device AD1 112 is in the transmission range of the simple devices SD1 102 and SD2 104. Since the simple devices SD1 102 and SD2 104 can receive the SD-waveform beacons 116 from the advanced device AD1 112 and the advanced device AD1 112 can hear the SD-waveform beacons 116 from the simple devices SD1 102 and SD2 104, the interference from the simple devices SD1 102 and SD2 104 to the advanced device AD1 112 can be prevented. And, since the advanced device AD2 114 is not in the transmission range of the simple devices SD1 102 and SD2 104, the transmissions between the simple devices SD1 102 and SD2 104 cannot interfere with the advanced device AD2 114.

Figure 2:
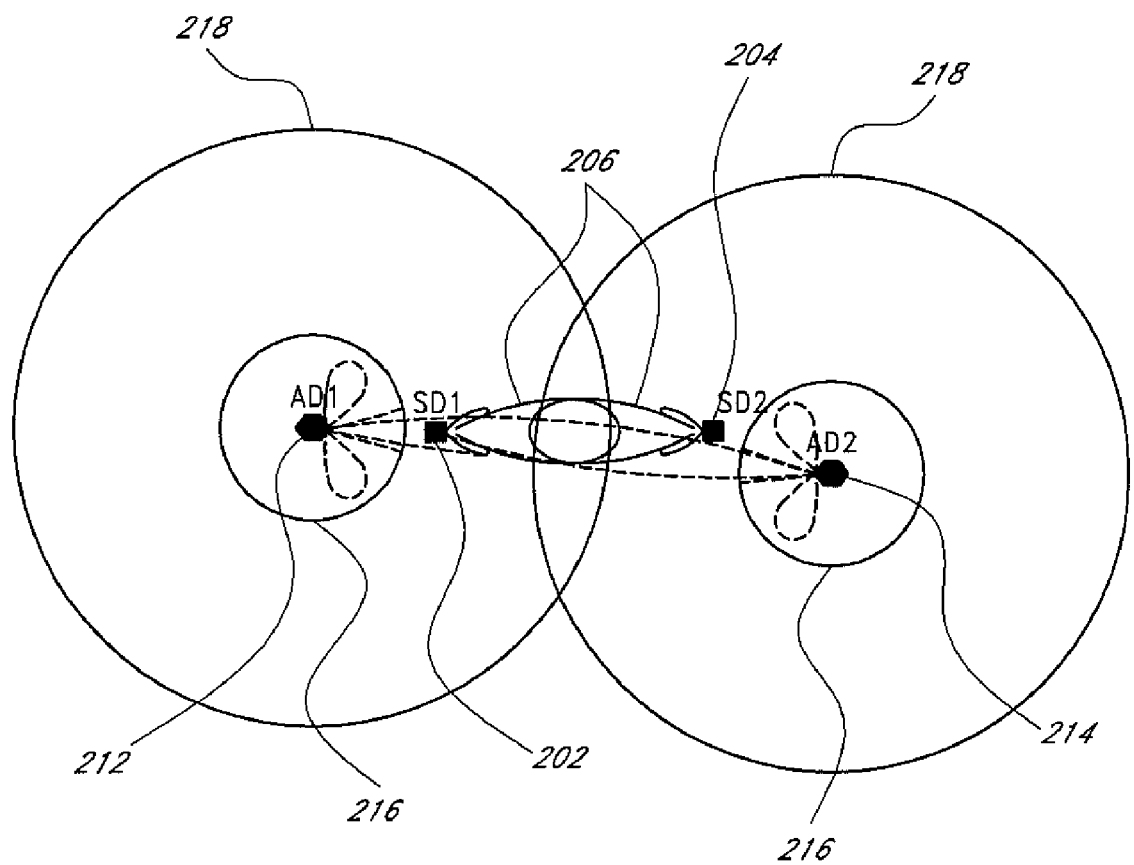
FIG. 2 is a diagram illustrating an interference problem.

The above approach does not guarantee non-interference from AD-waveform transmissions to SD devices. Referring to FIG. 2, if SD1 202 and SD2 204 already have an ongoing SD-waveform transmission, then AD1 212 and AD2 214 turn on and cannot receive SD-waveform beacons 206 from SD1 202 and SD2 204. Then AD1 212 and AD2 214 start to send out beacons 216, 218. After AD1 212 and AD2 214 discover each other through beacons, a beamformed AD-waveform transmission will be started. However, the beamformed AD-waveform transmission between AD1 212 and AD2 214 may interfere with the SD-waveform transmission between SD1 202 and SD2 204. Channel sensing with energy detection or preamble detection can be used to partially solve this problem. Besides listening to AD-waveform and SD-waveform beacons, an AD also does channel sensing with energy detection in those channel time blocks that no received beacons claim for reservation. Compared to channel sensing in the whole channel time, the dual-beacon approach can reduce power consumption by only sensing those unreserved channel time blocks. The AD will try to send out both SD-waveform and AD-waveform beacons when the channel is free and make channel reservations of the free channel time blocks for data transmissions. If not enough channel time is available, the AD will switch to another channel.

SDs can also take advantage of channel sensing to reduce the probability of being interfered with by AD-waveform transmissions though SDs cannot understand AD-waveforms. Besides listening to SD-waveform beacons, an SD also does channel sensing with energy detection or preamble detection in those channel time blocks that any received beacons do not claim for reservation. The SD will try to send out SD-waveform beacons when the channel is free and make channel reservations of the free channel time blocks for data transmissions. If not enough channel time is available, the SD will switch to another channel.

In the case that AD-waveform transmission interferes with SD-waveform transmissions, the receiver and/or the transmitter of the SD-waveform can dynamically request to switch to other free channel time blocks or switch to another channel to solve the interference problem. If the receiver and the transmitter of the SD-waveform transmission have repeated packet errors in the same place of each superframe or have long-time continuous packet errors, the receiver and the transmitter will know the SD-waveform transmission is being interfered by AD-waveform transmission. They will then try to find other free channel time blocks or switch to another channel.

ADs may support the receiving of both AD-waveform and SD-waveform beacons and other data. For receiving data on the reserved channel time blocks, since beacons already tell an AD which waveform format will be received in each reserved channel time block, the AD can set the right waveform receiving configuration mode at the beginning of each reserved channel block. However, it is difficult for an AD to know the waveform mode for a coming beacon or data packets on the unreserved channel time blocks. To solve this problem, a common indicator in the PHY preamble of the beacon and data packet is introduced. After parsing the common indicator, the AD can know whether the coming beacon or data packet is in SD-waveform or AD-waveform. In addition, the common indicator can also identify which mode of the SD-waveform or AD-waveform is used for the remaining of the packet. Then the AD can set to the corresponding receiving configuration and process the remaining parts of the beacon or data packet.

Operation of Simple Device (SD)

In an exemplary embodiment, the operation of an SD is as follows.

(1) When an SD turns on, it starts to sense each channel, e.g., by energy detection or preamble detection, tries to find SD-waveform beacons, and records when the channel is busy (including reserved channel time announced in the beacons and channel busy time with channel sensing).

(2a) If the SD cannot receive a beacon from the device that it wants to connect after scanning all channels several times, then (2a1) If the SD is not the initiator of connection with another device, the SD will choose the cleanest channel, integrate all channel time reservation information from all SD-waveform beacons on the same channel, put the integrated channel time reservation information into its own SD-waveform beacon, and select a free channel time slot to send out its own SD-waveform beacon periodically.

(2a2) If the SD is the initiator of connection with another device, the SD will repeat the channel scan until finding a beacon from the device that it wants to connect to or a timeout occurs.

(2b) If the SD receives a beacon from the second device it wants to connect to, the SD device will integrate all channel time reservation information from all SD-waveform beacons on the same channel, put the integrated channel time reservation information into its own SD-waveform beacon, and select a free channel time slot to send out its own SD-waveform beacon periodically.

(3) After the SD and the device that it wants to connect to can hear beacons from each other, they enter a bandwidth reservation and data transmission process.

Operation of Advanced Device (AD)

In an exemplary embodiment, the operation of an AD is as follows.

(1) When an AD turns on, it starts to sense each channel by energy detection or preamble detection, tries to find SD-waveform and AD-waveform beacons, and records when the channel is busy (including reserved channel time announced in the beacons and channel busy time with channel sensing).

(2a) If the AD cannot receive a beacon from the device that it wants to connect after scanning all channels several times, then (2a1) If the AD is not the initiator of connection with another device, the AD will choose the cleanest channel, integrate all channel time reservation information from all SD-waveform and AD-waveform beacons on the same channel, put the integrated channel time reservation information into its own SD-waveform and AD-waveform beacons, and select two free channel time slots to send out its own SD-waveform and AD-waveform beacons periodically.

(2a2) If the AD is the initiator of connection with another device, the AD will repeat the channel scan until finding a beacon from the device that it wants to connect to or a timeout occurs.

(2b) If the AD receives a beacon from the second device it wants to connect, the AD device will integrate all channel time reservation information from all SD-waveform and AD-waveform beacons on the same channel, put the integrated channel time reservation information into its own SD-waveform and AD-waveform beacons, and select two free channel time slots to send out its own SD-waveform and AD-waveform beacons periodically.

(3) After the AD and the device that it wants to connect to can hear beacons from each other, they enter a bandwidth reservation and data transmission process.

Coexistence of Advanced Device (AD) and Simple Device (SD)

In an embodiment, while SD-waveform transmission is ongoing between two SD devices, an AD may turn on. As an example shown in FIG. 1, AD1 and AD2 may turn on while SD1 and SD2 are transmitting SD-waveform data to each other. If the AD can hear the SD-waveform beacons, which means the AD is within the transmission range of SDs. The AD can avoid interfering SD-waveform transmissions by reading the channel time reservation information in the SD-waveform beacons. If the AD cannot hear the SD-waveform beacons, which mean the AD is outside of the transmission range of SDs and the ongoing SD-waveform transmission will not interfere the AD. The AD can reduce the probability of interfering SD-waveform transmissions by channel sensing.

In another embodiment, while AD-waveform transmission is ongoing between two AD devices, an SD may turn on. As an example shown in FIG. 1, while AD1 and AD2 are transmitting AD-waveform data to each other, SD1 and SD2 turns on. If the SD can hear the SD-waveform beacons from at least one of the ADs, which means at least one AD is within the transmission range of the SD. The SD can avoid interfering AD-waveform transmissions by reading the channel time reservation information in the SD-waveform beacons sent from the ADs. If the SD cannot hear the SD-waveform beacons, which means all ADs are outside of the transmission range of the SD and the SD will not interfere the ongoing AD-waveform transmission. The SD can avoid being interfered by the ongoing AD-waveform transmissions by channel sensing.

In still another embodiment, while SD-waveform transmission is ongoing between an SD and an AD called ADo, another AD called ADn may turn on. As an example shown in FIG. 1, AD2 may turn on while SD1 and AD1 are transmitting SD-waveform data to each other. If the ADn can hear the SD-waveforms or AD-waveform beacons, which means the ADn is within the transmission range of the SD or the ADo. The ADn can avoid interfering SD-waveform transmissions by reading the channel time reservation information in the SD-waveform or AD-waveform beacons. If the ADn cannot hear the SD-waveform or AD-waveform beacons, which means the ADn is outside of the transmission range of the SD and the ADo and the ongoing SD-waveform transmission will not interfere the ADn. The ADn can reduce the probability of interfering SD-waveform transmissions by channel sensing.

In still another embodiment, while SD-waveform transmission is ongoing between an SD called SDo and an AD, another SD called SDn turns on. As an example shown in FIG. 1, SD2 may turn on while SD1 and AD1 are transmitting SD-waveform data to each other. If the SDn can hear the SD-waveform beacons, which means the SDn is within the transmission range of the SDo or the AD. The SDn can avoid interfering SD-waveform transmissions by reading the channel time reservation information in the SD-waveform beacons. If the SDn cannot hear the SD-waveform beacons, which means the SDn is outside of the SD-waveform transmission range of the SDo and the AD, and the ongoing SD-waveform transmission will not interfere the SDn. The SDn can reduce the probability of being interfered by the AD in the future by channel sensing.

Common Frame Format

Since it is difficult for an AD to know the waveform mode for a incoming beacon or data packets on the unreserved channel time blocks as discussed above, a common indicator can be introduced in the PHY preamble of the beacon and data packet.

Figure 3:
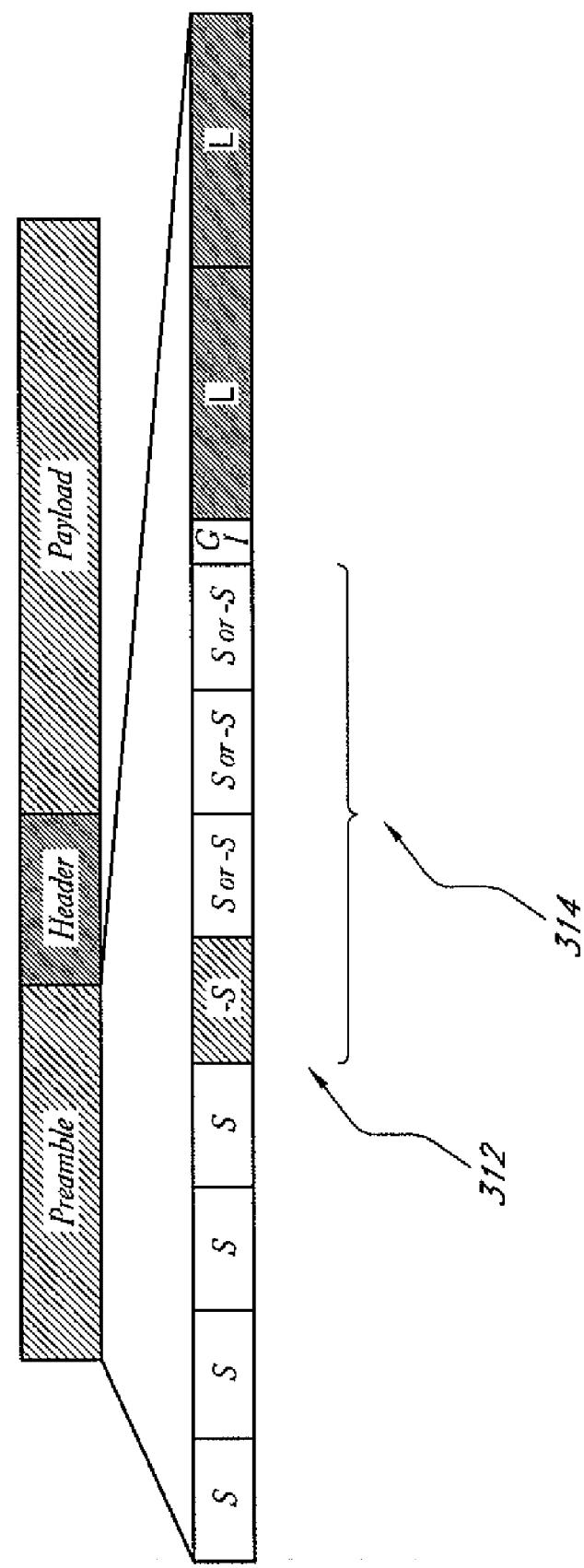
FIG. 3 is a diagram illustrating common indicators in an embodiment of the invention.

In general, a PHY preamble includes periodic sequences for robust detection and synchronization. In certain embodiments, a sign inversion can be used to indicate the payload waveform and transmitter device class as shown in FIG. 3.

Figure 4:
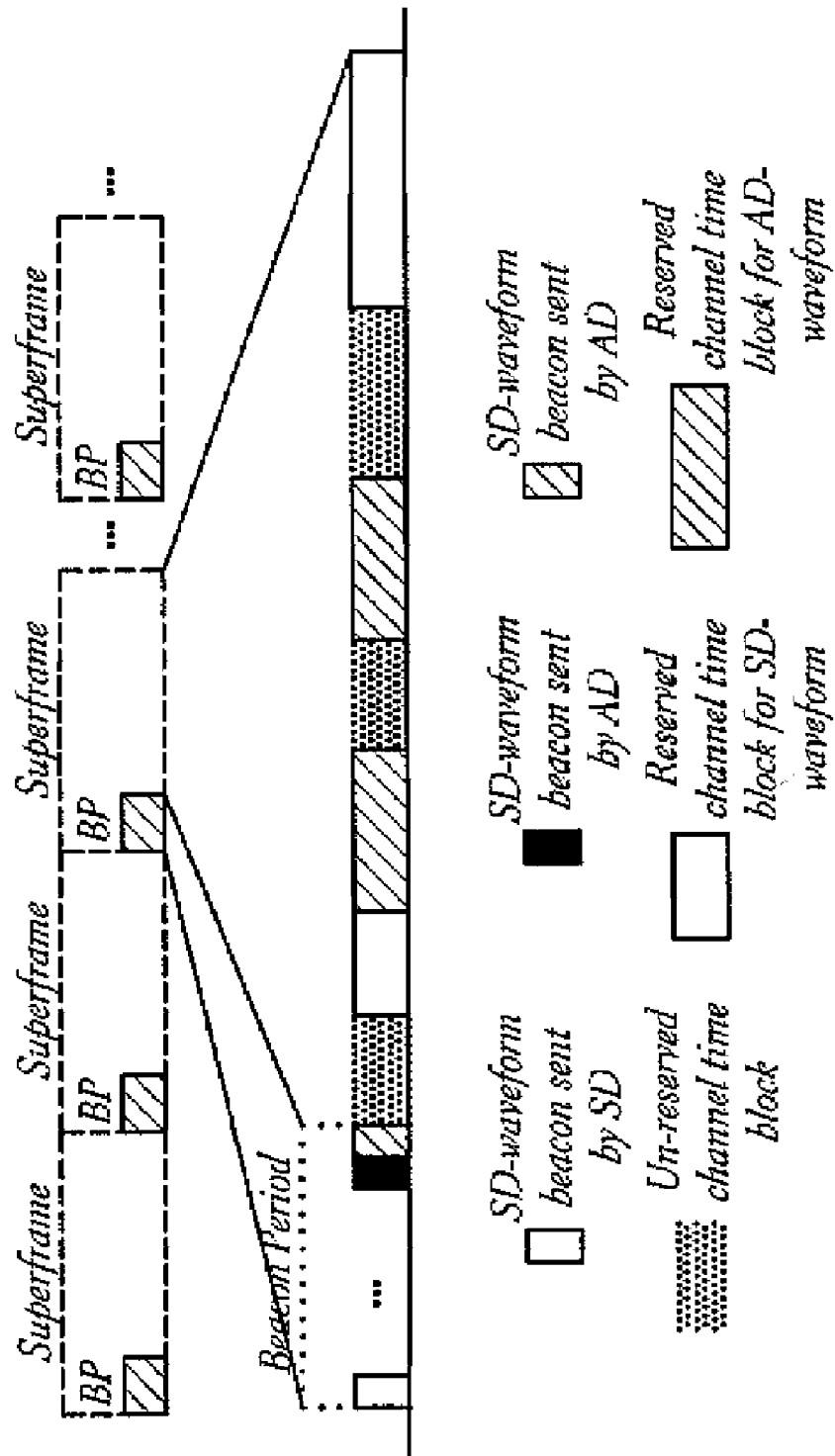
FIG. 4 is a diagram illustrating a superframe structure according to an embodiment of the invention.

FIG. 4 is a diagram illustrating a superframe structure. The starting of each superframe is a beacon period which includes SD-waveform and AD-waveform beacons from ADs and SD-waveform beacons from SDs. The remaining bits of each superframe consist of reserved channel time blocks and unreserved channel time blocks. The reserved channel time blocks can be used for SD- and AD-waveform transmissions. Both SD- and AD-waveform beacons carry the channel time block scheduling information for both SD- and AD-waveforms.

Method of Dual Beacon Mechanism

Figure 5:
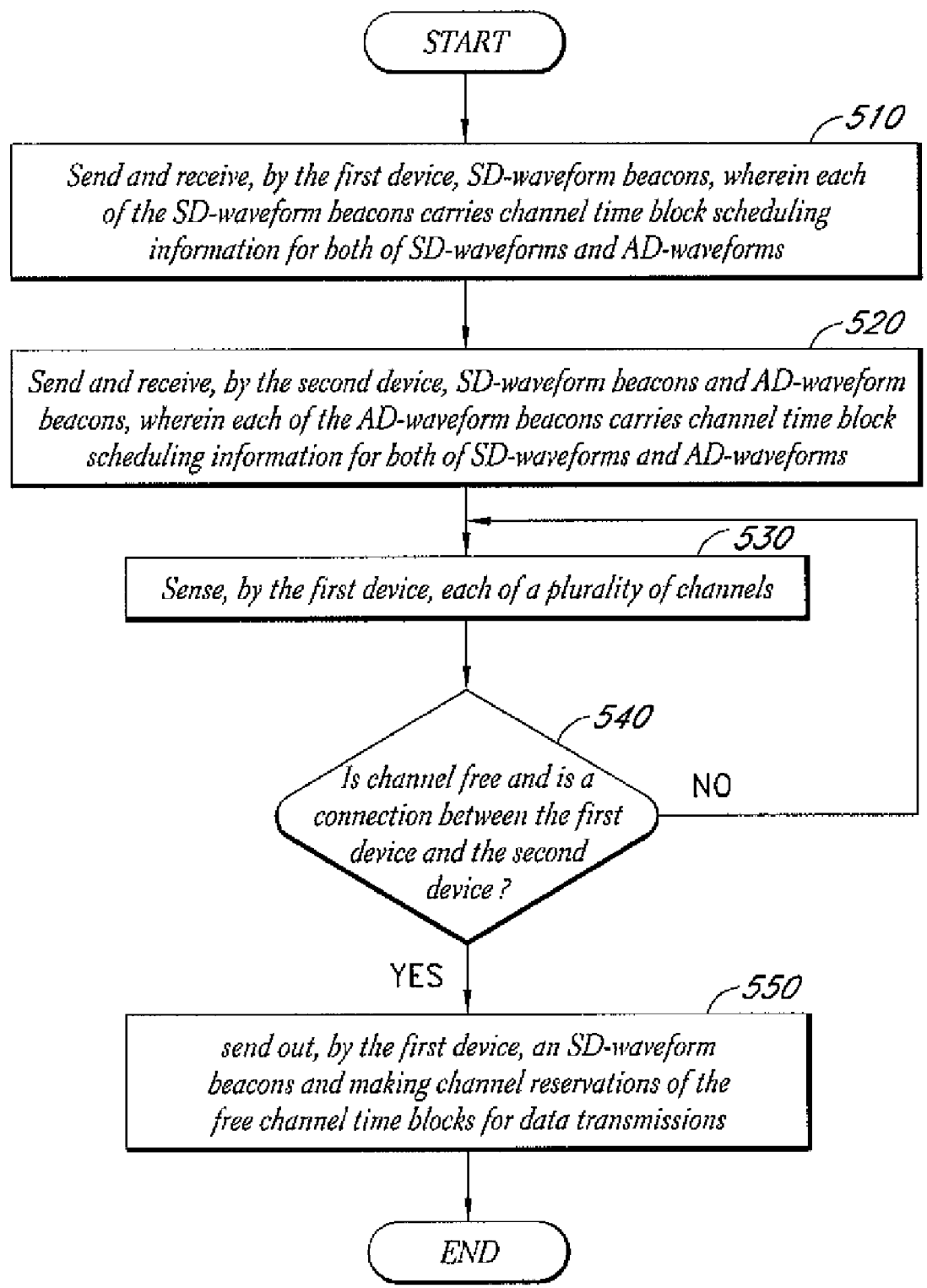
FIG. 5 is a flowchart illustrating a method for a dual-beacon mechanism according to an embodiment of the invention.

FIG. 5 is a flowchart illustrating a method for a dual-beacon mechanism according to an embodiment of the invention.

First, sending and receiving a plurality of beacons of a first device type from a plurality of devices of the first device type or a second device type, by a first device of the first device type, wherein each of the plurality of beacons carries channel time block scheduling information for data communication of the plurality of devices of the first device type or the second device type (510). Then, sending and receiving a plurality of beacons of the first device type or the second device type from a plurality of devices of the first device type or a second device type, by a second device of the second device type, wherein each of the plurality of beacons carries channel time block scheduling information for data communication of the plurality of devices of the first device type or the second device type (520). Then, sensing, by the first device, each of a plurality of channels (530). Then, finding a free channel for data communication between the first device and the second device (540). Then, sending out, by the first device, beacons of the first device type. Then, making channel reservations of time blocks of the free channel for data transmissions (550).

Figure 6:
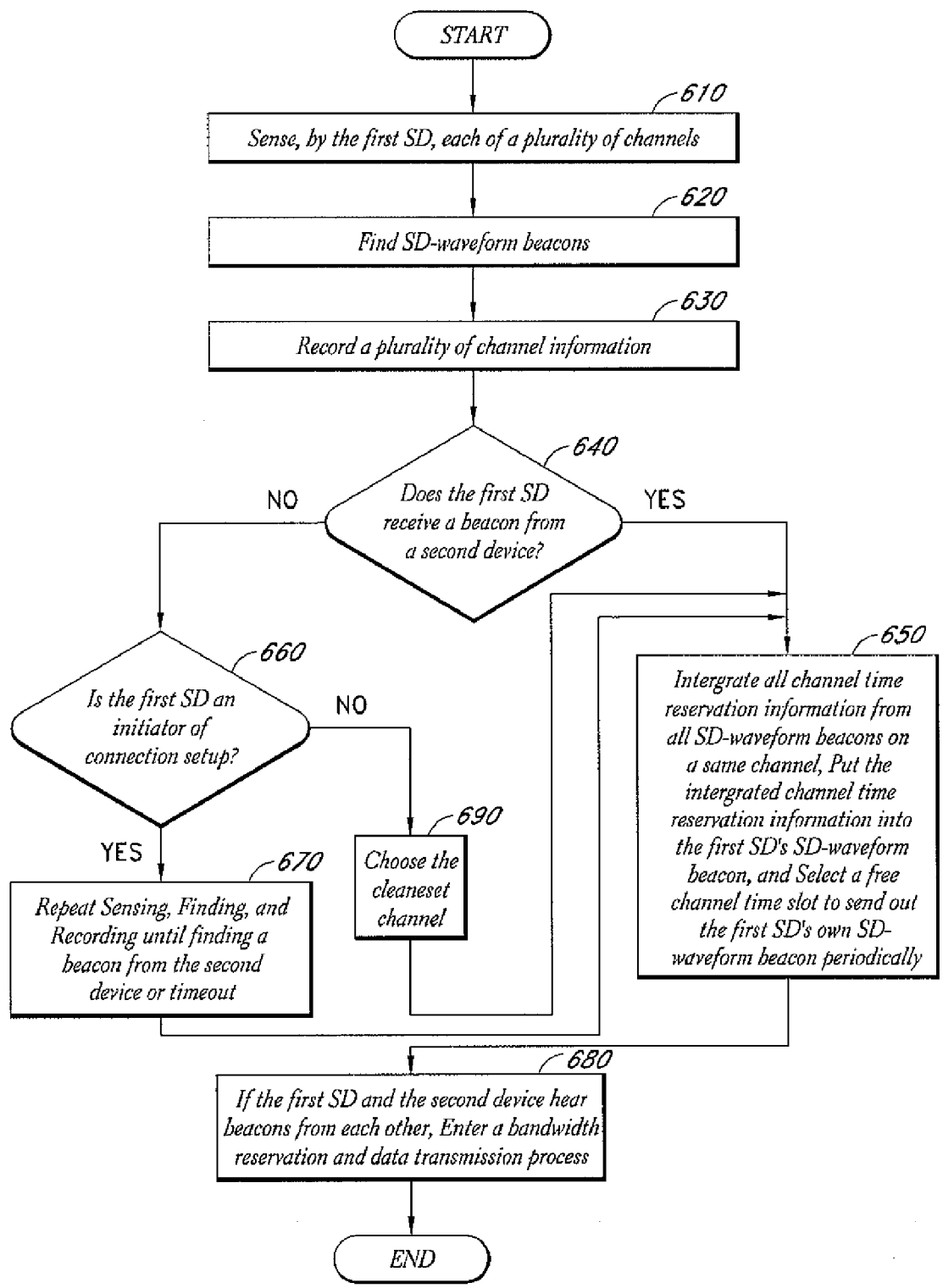
FIG. 6 is a flowchart illustrating a method for a simple device using a dual-beacon mechanism according to another embodiment of the invention.

FIG. 6 is a flowchart illustrating a method for a simple device using a dual-beacon mechanism according to another embodiment of the invention.

First, sensing, by the first SD, each of a plurality of channels (610). Then, finding SD-waveform beacons (620). Then, recording a plurality of channel information (630). Then, if the first SD does not receive a beacon from a second device (640) and if the first SD is not an initiator of connection setup (660), choosing a cleanest channel, integrating all channel time reservation information from all SD-waveform beacons on a same channel (690), putting the integrated channel time reservation information into the first SD's SD-waveform beacon, and selecting a free channel time slot to send out the first SD's own SD-waveform beacon periodically (650); if the first SD does not receive a beacon from a second device (640) and if the first SD is the initiator of connection setup (660), repeating sensing, finding, and recording until finding a beacon from the second device or timeout (670), Then, if the first SD receives a beacon from the second device, integrating all channel time reservation information from all SD-waveform beacons on the same channel (640), putting the integrated channel time reservation information into the first SD's own SD-waveform beacon, and selecting a free channel time slot to send out the first SD's own SD-waveform beacon periodically (650). Then, if the first SD and the second device hear beacons from each other, entering a bandwidth reservation and data transmission process (680), wherein each of the first SD and the one or more SDs has a first range, wherein each of the one or more ADs has a second range, and wherein the first range is shorter than the second range.

Figure 7:
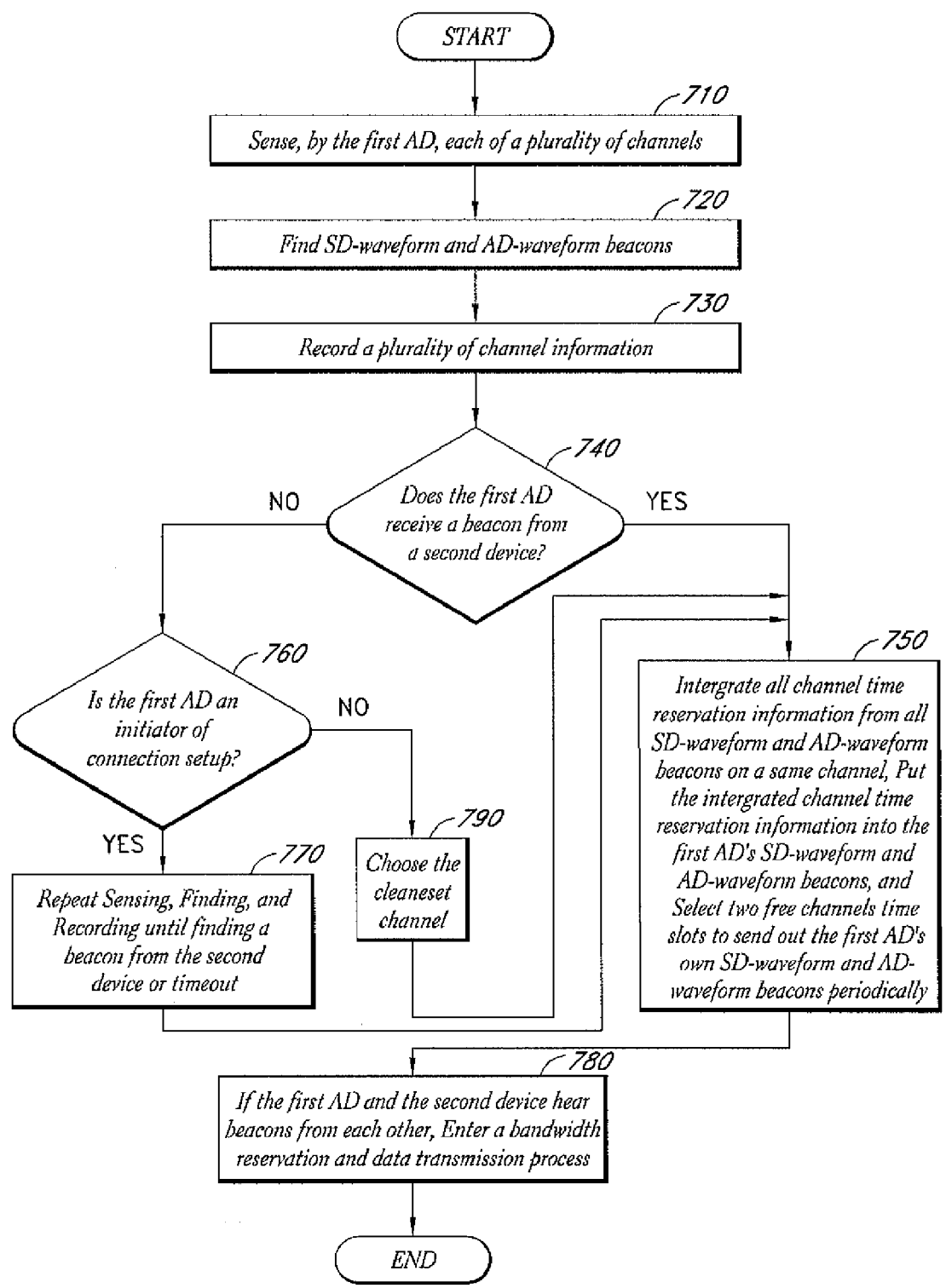
FIG. 7 is a flowchart illustrating a method for an advanced device using a dual-beacon mechanism according to still another embodiment of the invention.

FIG. 7 is a flowchart illustrating a method for an advanced device using a dual-beacon mechanism according to still another embodiment of the invention.

First, sensing, by the first AD, each of a plurality of channels (710). Then, finding SD-waveform beacons and AD-waveform beacons (720). Then, recording a plurality of channel information (730). Then, if the first AD does not receive a beacon from a second device (740) and if the first AD is not an initiator of connection setup (760), choosing a cleanest channel (790), integrating all channel time reservation information from all SD-waveform beacons and all AD-waveform beacons on a same channel, putting the integrated channel time reservation information into the first AD's SD-waveform beacon and AD-waveform beacon, and selecting two free channel time slots to send out the first AD's own SD-waveform beacon and AD-waveform beacon periodically (750). Then, if the first AD does not receive a beacon from a second device (740) and if the first AD is the initiator of connection setup (760), repeating sensing, finding, and recording until finding a beacon from the second device or timeout (770). Then, if the first AD receives a beacon from the second device (740), integrating all channel time reservation information from all SD-waveform beacons and all AD-waveform beacons on the same channel, putting the integrated channel time reservation information into the first SD's own SD-waveform beacon and AD-waveform beacon, and selecting two free channel time slots to send out the first SD's own SD-waveform beacon and AD-waveform beacon periodically (750). Then, if the first AD and the second device hear beacons from each other, entering a bandwidth reservation and data transmission process (780), wherein each of the first SD and the one or more SDs has a first range, wherein each of the one or more ADs has a second range, and wherein the first range is shorter than the second range.

Conclusion

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of wireless data communication over a network of devices, the method comprising:
    sending, via a selected directional device, a first plurality of directional beacons;
    receiving, at the selected directional device, a second plurality of directional beacons;
    sending, via a selected omni-directional device, a third plurality of directional beacons and a first plurality of omni-directional beacons;

receiving, at the selected omni-directional device, the first plurality of directional beacons and a second plurality of omni-directional beacons from another omni-directional device;

the selected directional device:
sensing each of a plurality of channels;
locating a channel with free channel time blocks for data communication between the selected directional device and the selected omni-directional device;
making channel reservations of free channel time blocks for data transmissions;
placing channel reservation information into a new directional beacon; and
selecting a free time slot of the located channel to periodically send out the new directional beacon.

2. The method of claim 1, wherein each directional and omni-directional beacon carries channel time block scheduling information for data communication over the network.

3. The method of claim 1, wherein sending, via the selected directional device, and receiving, at the selected directional device, comprises sending and receiving using a single carrier, and wherein sending, via the omni-directional device, and receiving, at the omni-directional device, comprises sending and receiving using orthogonal frequency-division multiplexing (OFDM).

4. The method of claim 1, wherein sensing comprises using energy detection.

5. The method of claim 1, wherein sensing comprises using preamble detection.

6. The method of claim 1, wherein the data communication comprises the communication of uncompressed video data.

7. A system for wireless data communication over a network of devices, the system comprising:
a directional device having a directional antenna, wherein the directional device is configured for sending and receiving directional beacons;
an omni-directional device, wherein the omni-directional device is configured for sending and receiving directional beacons and omni-directional beacons;
a placing module configured for obtaining channel reservation information from the received directional beacons and placing the channel reservation information obtained from the received directional beacons into a new directional beacon; and
a selecting module configured for selecting a free time slot of a channel with free channel time blocks for periodically sending out the new directional beacon.

8. The system of claim 7, wherein the directional device is further configured to:
sense each of a plurality of channels,
locate a free channel for data communication between the directional device and the omni-directional device, and
make channel reservations of time blocks of the free channel for data transmissions.

9. The system of claim 7, wherein each of the directional beacons and omni-directional beacons carries channel time block scheduling information for data communication over the network.

10. The system of claim 7, wherein the directional device has a first range, wherein the omni-directional device has a second range, and wherein the first range is less than the second range.

11. The system of claim 7, wherein the directional device is configured to send and receive using a single carrier, and wherein the omni-directional device is configured to send and receive using orthogonal frequency-division multiplexing (OFDM).

12. The system of claim 7, wherein the data communication comprises the communication of uncompressed video data.

13. The system of claim 7, wherein the data communication comprises wireless communication of uncompressed high definition (HD) video data.

14. The system of claim 7, wherein the devices comprise simple devices (SD) and advanced devices (AD), wherein SD devices and AD devices are distinguishable based on directionality, range, and ability for transmitting SD waveform beacons and AD waveform beacons.

15. The system of claim 14, wherein each AD device supports a basic SD-waveform in which an SD-waveform beacon is transmitted.

16. A method of wireless data communication over a network of devices, the method comprising:
sensing, by a directional device, each of a plurality of channels;
locating, by the directional device, a plurality of directional beacons from the plurality of channels;
recording channel use information;
selecting a channel based, at least in part, on the recorded channel use information;
integrating channel reservation information from the plurality of directional beacons of the selected channel;
placing the integrated channel reservation information into a new directional beacon; and
selecting a free time slot of the selected channel to periodically send out the new directional beacon.

17. The method of claim 16, further comprising:
repeatedly sensing, locating, and recording until a beacon from an omni-directional device is found or a predetermined time is reached; and
if an omni-directional device is found, entering a bandwidth reservation and data transmission process with the selected free channel time slot.

18. The method of claim 16, wherein data communication comprises the communication of uncompressed video data.

19. A method of wireless data communication over a network of devices, the method comprising:
sensing, by an omni-directional device, each of a plurality of channels;
locating, by the omni-directional device, a plurality of directional beacons and a plurality of omni-directional beacons from the plurality of channels;
recording channel use information;
selecting a channel based, at least in part, on the recorded channel use information;
integrating channel time reservation information from the plurality of directional beacons of the selected channel and the plurality of omni-directional beacons of the selected channel;
placing the integrated channel time reservation information into a new directional beacon and a new omni-directional beacon; and
selecting a first free time slot of the selected channel to periodically send out the new directional beacon and a second free time slot of the selected channel to periodically send out the new omni-directional beacon.

20. The method of claim 19, further comprising:
repeatedly sensing, locating, and recording until finding a beacon from a second omni-directional device or a predetermined time is reached; and if a second omni-directional device is found, executing a bandwidth reservation and data transmission process.

21. The method of claim 19, wherein the omni-directional device is a portable device.

22. The method of claim 19, wherein the data communication comprises the communication of uncompressed video data.

23. A device for wireless data communication over a network of devices, the device comprising:
- a directional antenna;
- a sensing module configured to sense each of a plurality of channels;
- a locating module configured to locate a plurality of directional beacons from the plurality of channels;
- a recording module configured to record channel use information;
- a first selecting module configured to select a channel based, at least in part, on the recorded channel use information;
- an integrating module configured to integrate channel reservation information from the plurality of directional beacons of the selected channel;
- a placing module configured to place the integrated channel reservation information into a new directional beacon; and
- a second selecting module configured to select a free time slot of the selected channel to periodically send out the new directional beacon.

24. The device of claim 23, wherein data communication comprises the communication of uncompressed video data.

25. A device for wireless data communication over a network of devices including at least one directional device having a directional antenna and at least one omni-directional device, the device comprising:
- a sensing module configured to sense each of a plurality of channels;
- a locating module configured to locate a plurality of directional beacons and a plurality of omni-directional beacons from the plurality of channels;
- a recording module configured to record channel use information;
- a first selecting module configured to select a channel based, at least in part, on the recorded channel use information;
- an integrating module configured to integrate channel time reservation information from the plurality of directional beacons of the selected channel and the plurality of omni-directional beacons of the selected channel;
- a placing module configured to place the integrated channel time reservation information into a new directional beacon and a new omni-directional beacon; and
- a second selecting module configured to select a first free time slot of the selected channel to periodically send out the new directional beacon and a second free time slot of the selected channel to periodically send out the new omni-directional beacon.

26. The device of claim 25, wherein the device comprises a portable device.

27. The device of claim 25, wherein the data communication comprises the communication of uncompressed video data.

* * * * *